United States Patent
Ikenoue

(10) Patent No.: US 8,428,306 B2
(45) Date of Patent: Apr. 23, 2013

(54) INFORMATION PROCESSOR AND INFORMATION PROCESSING METHOD FOR PERFORMING PROCESS ADAPTED TO USER MOTION

(75) Inventor: Shoichi Ikenoue, Chiba (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 457 days.

(21) Appl. No.: 12/756,294

(22) Filed: Apr. 8, 2010

(65) Prior Publication Data

US 2010/0328319 A1    Dec. 30, 2010

(30) Foreign Application Priority Data

Jun. 26, 2009 (JP) ................................ 2009-152567

(51) Int. Cl.
*G06K 9/00* (2006.01)
*G06T 13/00* (2011.01)

(52) U.S. Cl.
USPC .......................................... 382/103; 345/474

(58) Field of Classification Search .................. 382/103, 382/107, 236; 345/474; 348/94, 154, 155, 348/169, 170, 171, 172, 208.1, 208.14, 208.16, 348/352
See application file for complete search history.

(56) References Cited

U.S. PATENT DOCUMENTS 6,993,157 B1 * 1/2006 Oue et al. ...................... 382/103

FOREIGN PATENT DOCUMENTS

| JP | 2003-216955 | 7/2003 |
|---|---|---|
| WO | 2007/050885 | 5/2007 |

OTHER PUBLICATIONS

Michael Isard, et al. "ICONDENSATION: Unifying Low-Level and High-Level Tracking in a Stochastic Framework" Department of Engineering Science, University of Oxford, http://robots.ox.ac.uk/ab.

* cited by examiner

*Primary Examiner* — Abolfazl Tabatabai
(74) *Attorney, Agent, or Firm* — Katten Muchin Rosenman LLP

(57) ABSTRACT

A positional data acquisition unit of an action detector acquires positional data indicating the position of an image of a light-emitting part of a light-emitting device held by a user in an image frame at each time step, and also acquires curve data for the head contour at each time step estimated as a result of visual tracking by a tracking processor. A history storage unit stores a history of the positional data for an image of a light-emitting part and the curved data for the head contour. A determination criteria storage unit stores the criteria for determining that a predefined action is performed by referring to the time-dependent change in the relative position of the image of the light-emitting part in relation to the curve representing the head contour. An action determination unit determines whether the action is performed based on the actual data.

13 Claims, 13 Drawing Sheets

INFORMATION PROCESSOR AND INFORMATION PROCESSING METHOD FOR PERFORMING PROCESS ADAPTED TO USER MOTION

BACKGROUND OF THE INVENTION

1. Field of the Invention

The present invention relates to information processing technology and, more particularly to an information processor that includes a user interface for performing a process adapted for a user input and to an information processing method executed in the processor.

2. Description of the Related Art

Recently, electronic devices and information processors such as game devices and home electric appliances feature highly advanced capabilities. Associated with this, systems for user input via a user interface have become complicated. Various modifications have been made to the user interface to facilitate the input in a complicated input system. Controllers and analog sticks provided with multiple control buttons are some examples. There is also proposed a technology to capture the user on a real time basis and detect its motion so as to reflect the motion in the content of processing and displayed screen.

More specifically, methods proposed for detection of user motion include a method of subjecting a captured image to pattern matching, and a method of acquiring a change in the position of light from a controller held by the user or from a light-emitting member attached to the user (see, for example, Japanese Patent Laid Open Publication 2003-216955, or WO 2007/050885A2).

RELATED ART LIST

JPA laid open 2003-216955
PCT Publication WO 2007/050885A2

In implementing the technology for acquiring user motion as input information, it is required to determine a natural motion as accurately as possible and as fast as possible. Implementation of a device that can be adapted to complicated motion will require more equipment and possibly result in more trouble for the user, increased manufacturing cost, increased computation cost, and poor response.

SUMMARY OF THE INVENTION

The present invention addresses the concern and a purpose thereof is to provide an information processing technology that includes a user interface capable of detecting complicated motion easily.

One embodiment of the present invention relates to an information processor. The information processor comprises: an imaging device adapted to capture the motion of a user provided with a marker as a moving image; a tracking process unit adapted to estimate the contour of the user in each image frame by defining a candidate curve representing the contour of the user in an image frame included in the moving image captured by the imaging device based on the contour of the user estimated in an image frame at a previous time step, and by observing the likelihood of each candidate curve; a history storage unit adapted to successively store the relative position, in each image frame, of an image of the marker in relation to the contour of the user estimated by the tracking process unit; an action determination unit adapted to determine whether an action is performed by checking a time-dependent change in the relative position stored by the history storage unit against a first criteria established for the action; and an output data generating unit adapted to perform, when the action determination unit determines that the action is performed, a process corresponding to the action and generate output data.

The term "marker" refers to an article having a predefined color and shape. The marker signifies the position of a body part of the user provided with the marker. A single marker or multiple markers may be provided. The mechanism for providing the user with a marker is non-limiting. For example, the user may hold an article provided with a marker at an end of a rod. The marker may be attached to the user. The user may wear clothing or an accessory with the marker attached.

Another embodiment of the present invention relates to an information processing method. The information processing method comprises: capturing the motion of a user provided with a marker as a moving image; estimating the contour of the user in each image frame by defining a candidate curve representing the contour of the user in an image frame included in the moving image based on the contour of the user estimated in an image frame at a previous time step, and by observing the likelihood of each candidate curve; successively storing in a memory the relative position, in each image frame, of an image of the marker in relation to the estimated contour of the user; determining whether an action is performed by checking a time-dependent change in the relative position read from the memory against a criteria established for the action; and performing, when the action is determined as being performed, a process corresponding to the action and generating output data.

Optional combinations of the aforementioned constituting elements, and implementations of the invention in the form of methods, apparatuses, systems, computer programs, and recording mediums embodying a computer program may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
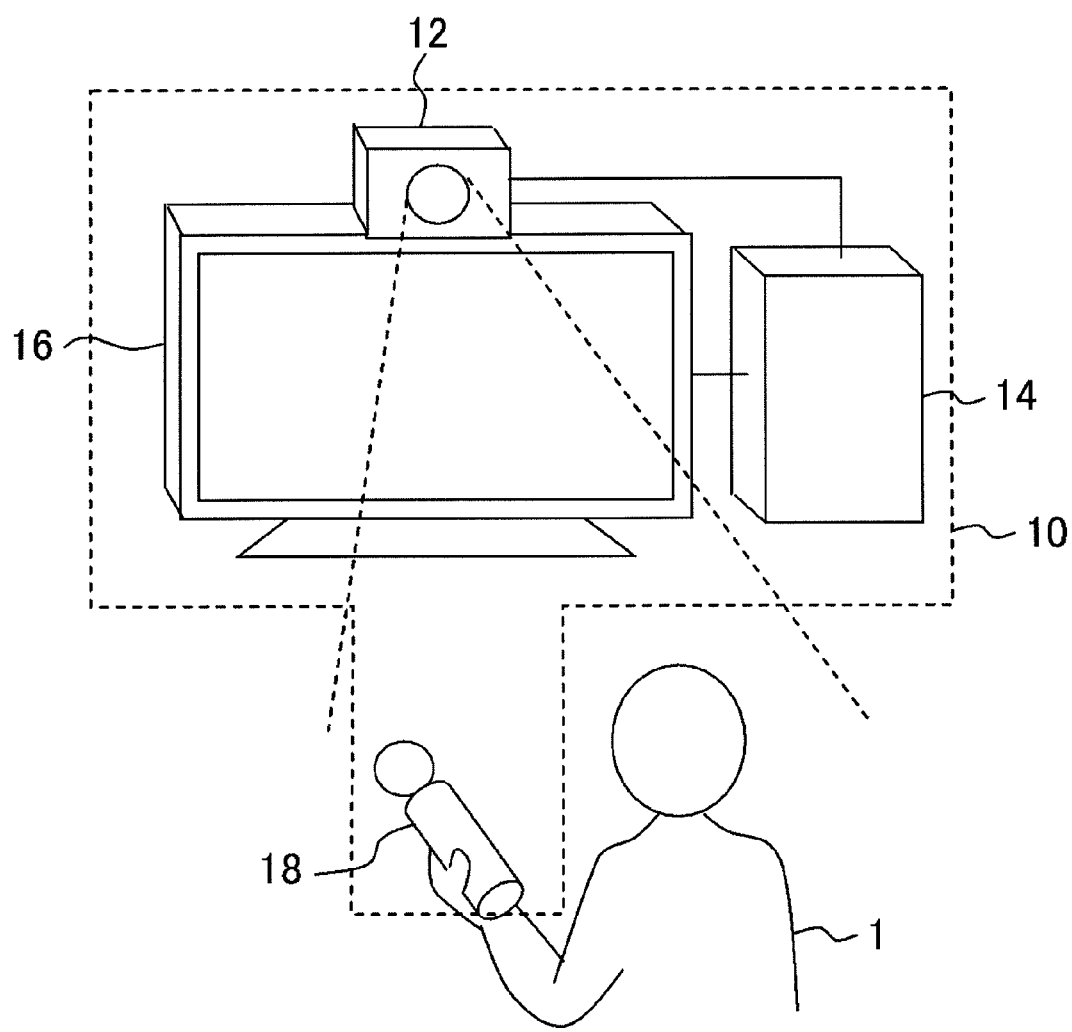
FIG. 1 shows an exemplary configuration of an information processing system to which an embodiment of the present invention is applicable.

FIG. 1 shows an exemplary configuration of an information processing system to which an embodiment of the present invention is applicable. An information processing system 10 comprises a light-emitting device 18, an imaging device 12 that captures a user 1 holding the light-emitting device 18 and light from the light-emitting device 18, an information processor 14 that detects the action of the user and performs information processing accordingly, and a display device 16 that outputs image data obtained as a result of processing by the information processor 14.

Connection between the information processor 14 and the imaging device 12 or connection between the information processor 14 and the display device 16 may be cable or wireless connection. The processor and the device may be connected via a network. Still alternatively, two of the imaging device 12, the information processor 14, and the display device 16 or all of the components may be assembled as one unit. The imaging device 12 may not necessarily be provided on the display device 16. A plurality of users 1 may use the system depending on the content of processing by the information processor 14, and a plurality of light-emitting devices 18 may be provided.

The imaging device 12 acquires data for images capturing the light-emitting device 18 and the user 1 at a predetermined frame rate. The moving image data thus acquired is entered in the information processor 14. The information processor 14 acquires the head contour of the user 1 and the position of light from the light-emitting device 18 by referring to the moving image data acquired from the imaging device 12. The processor 14 detects the action of the user by referring to the time-dependent change in the relative position. In acquiring the motion of the head of the user, the position of the shoulder line of the user is also acquired using the visual tracking technology described later. A variety of actions involving the user arm are identified by referring to the relative position of the shoulder line in relation to the light from the light-emitting device 18 held by the user. The display device 16 acquires the image data generated by the information processor 14 so as to reflect the result of detection of the action of the user 1, and outputs the image accordingly.

The information processor 14 may perform any of a variety of non-limiting processes after detecting the action. The embodiment focuses on the motion of the head and hand and is directed to detecting the motion of the upper half of the body. Motion of the lower half of the body (e.g., foot) or the whole of the body may similarly be detected by changing the position of mounting the light-emitting device 18 or the shape of the template used in the tracking process. Any marker that does not emit light may be used in place of the light-emitting device 18 so long as the marker has a predetermined color or shape and is recognized in distinction from other objects captured in an image.

Figure 2:
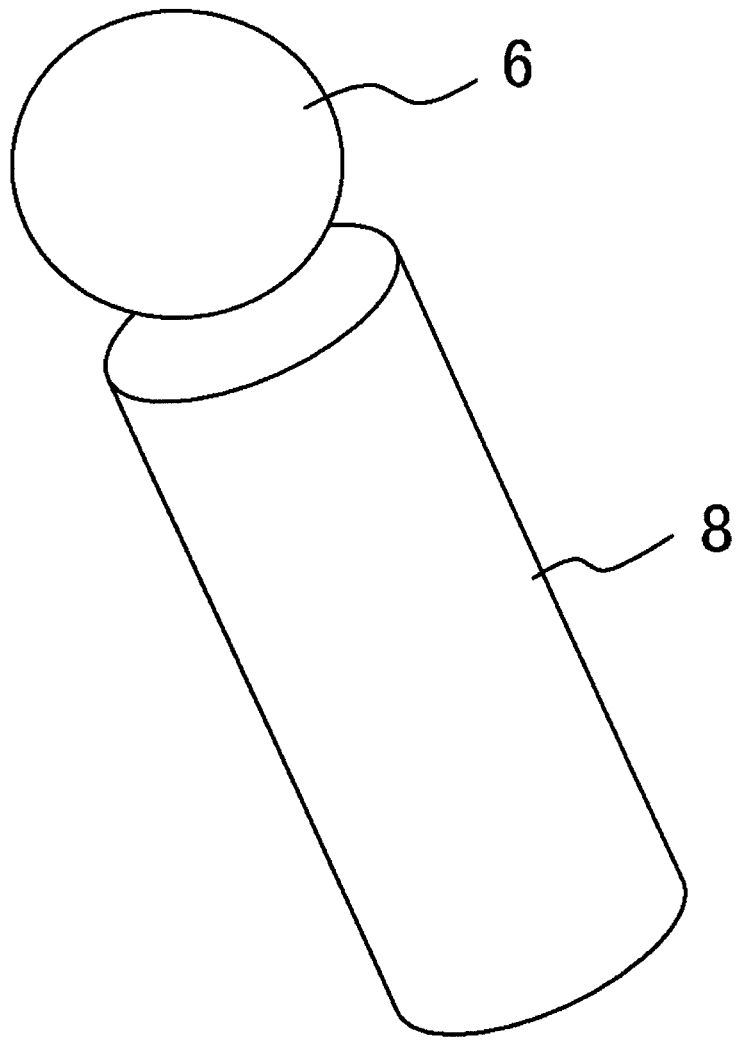
FIG. 2 shows the configuration of a light-emitting device.

FIG. 2 shows the configuration of the light-emitting device 18. The light-emitting device 18 includes a light-emitting part 6 and a handle 8. The light-emitting part 6 has a spherical body provided internally with an ordinary light-emitting object (e.g., a light-emitting diode or an electric bulb) and formed by a light-transmitting resin or the like. While the light-emitting part 6 emits light, the whole of the part 6 emits light. The handle 8 is held by the hand of the user and may be provided as needed with an input button (not shown) for turning on or off the device 18. The handle 8 may be provided with a communication means for exchanging information with the information processor 14 by cable or by radio. In this case, different colors of light may be assigned to multiple users. Alternatively, the color of emitted light may be varied depending on the progress of the process.

The handle 8 may be provided internally with a gyro sensor (not shown). In addition to the head contour of the user and the position of the light-emitting part 6, the output from the sensor may be used for detection of the user action. In addition to or in pace of the gyro sensor, the handle may be provided with an acceleration sensor or a geomagnetic sensor. The light-emitting device 18 may be of any shape so long as the user could it with himself or herself for light emission and is not limited to the shape shown in FIG. 2. Invisible light ray (e.g., infrared ray) may be used instead of using light emission from the light-emitting part 6. In this case, a device for detecting invisible light ray may be provided in addition to the imaging device 12. The action can be detected similarly as above by projecting the coordinates of the light ray into the coordinate system within the captured image in which the head contour is tracked.

A description will now be given of the process of detecting the action of the user 1 by the information processor 14. To detect the motion of the head contour including the shoulder line, a visual tracking process using a particle filter is performed in the image captured by the imaging device 12 and including the user 1. Visual tracking of the head contour is a technology to obtain a time evolution estimate of the head contour in each image frame of the moving image.

In this embodiment, an act (namely, an action performed by a human being) that consumes a certain time period is used as an input. Pattern matching, which is generally known as a technology for recognizing an imaged object, is basically a technology directed to still images. The use of pattern matching for detection of time-dependent change is exactly equivalent to stitching the results of detection in multiple still images. In this process, relevance to a previous image frame is not considered. Therefore, such an approach will likely to involve an error if the approach is applied to the detection of an event occurring in a finite time interval where a change in the situation is likely to take place as a result of, for example, involving multiple persons or involving a person in movement. The process of tracking the time evolution of the head contour according to the embodiment captures the motion of individual people accurately by referring to the relevance to a previous image frame.

Figure 3:
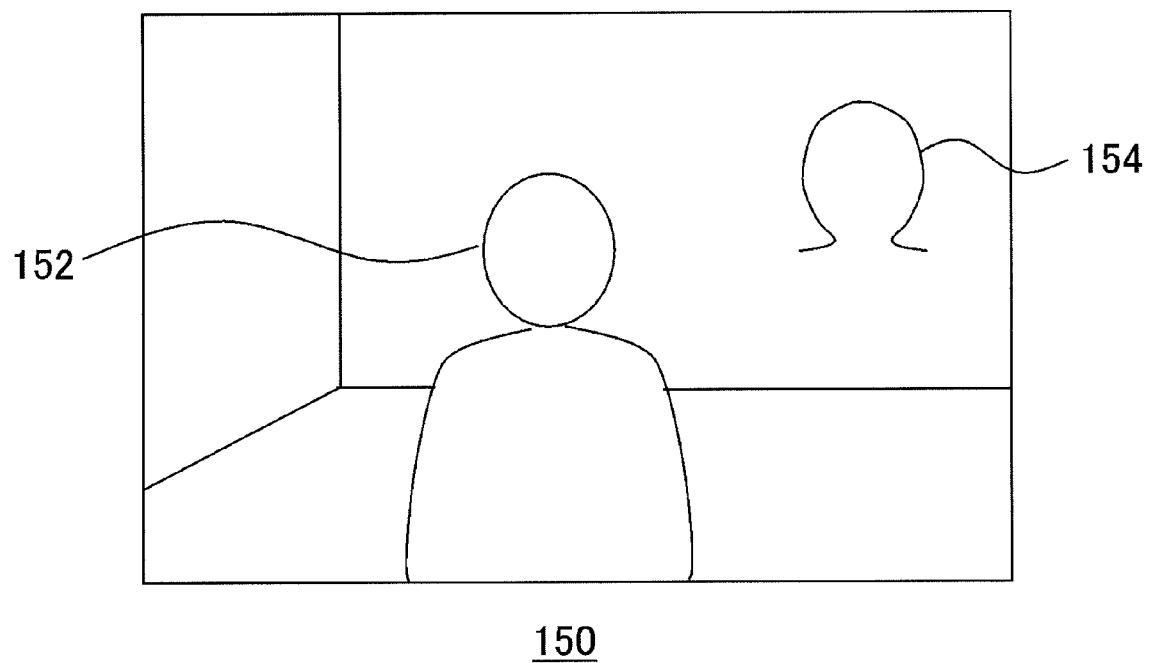
FIG. 3 shows illustrating a visual tracking method as applied to a human being.

FIG. 3 shows illustrating a visual tracking method as applied to a human being. A human image 150 is one of the image frames constituting an image stream of the moving image captured by the imaging device 12. The image 150 shows a person 152 that should be tracked. The person 152 corresponds to the user 1 of FIG. 1.

In order to track the motion of the person 152, the shape of the head contour of the person 152 is approximated by an ohm-shaped curve 154 where the ohm-shaped curve 154 is described by a known representation. The image of the person 150, which shows the person 152, is subjected to an edge extracting process, and an edge image is thereby obtained. The curve 154 is translated, expanded, contracted, or rotated by changing the parameters that define the curve 154 so as to search for an edge in the neighborhood of the curve 54. In this way, the parameters estimated to best match the head contour of the person 152 are identified. The above process is repeated for each frame, so that tracking of the person 152 proceeds. An edge is generally defined as a position at which density or color changes drastically in an image.

The matching of various curves 154 with different parameters and the head contour of the person 152 is implemented by a probability distribution prediction technique using a particle filter. Specifically, the number of the target candidates is reduced by increasing or decreasing samples of the curve 154 according to a probability distribution in the parameter space of the previous image frame. As a result, it becomes possible to focus the search on areas where the existence probability is high, allowing for accurate, efficient matching.

Applications of the particle filter to tracking which focuses on object contours are described in detail in, for example, the non-patent document ("ICondensation: Unifying low-level and high-level tracking in a stochastic framework, Michael Isard and Andrew Blake, Proc 5th European Conf. Computer Vision, 1998"). Those aspects of the tracking method that relate to the embodiment will be highlighted in the following description.

The ohm-shaped curve 154 is first described by a B-spline curve. The B-spline curve is represented by n control points ($Q_0, \ldots Q_n$) and n knots ($s_0, \ldots s_n$). These parameters are preset to describe a fundamental curve shape (in this instance, an ohm shape). The fundamental curve described by the preset parameters is hereinafter referred to as a template Qt. The shape described by the template Qt depends on a target object and, in the present instance, is an ohm shape when the person 152 in the human image 150 shown in FIG. 3 is the target object. For example, when the target object is a ball, the curve to be described has a circular shape; when the target object is a palm, the curve has a palm shape.

Next, a shape-space vector x is given as the transformation parameters for changing the template shape. The shape-space vector x is represented by six parameters as follows:

$$x = (\text{shift}_x, \text{shift}_y, \text{extend}_z \cos\theta - 1, \text{extend}_y \cos\theta - 1, -\text{extend}_x \sin\theta, \text{extend}_y \sin\theta)^T \quad (1)$$

where (shiftx, shifty) is a translation amount in (x, y) direction, (extendx, extendy) is a magnification, and θ is a rotation angle. Using the operational matrix W for applying the shape-space vector x to the template Qt, the curve after transformation, i.e., the candidate curve Q, is represented as follows:

$$Q = Wx + Q_0, \quad (2)$$

$$W = \begin{pmatrix} 1 & 0 & Q_0^x & 0 & 0 & Q_0^y \\ 0 & 1 & 0 & Q_0^y & Q_0^x & 0 \end{pmatrix}$$

Equation (2) with the six parameters of the shape-space vector x changed appropriately makes it possible to translate, rotate, expand, and contract the template and combinations of these operations allow the candidate curve Q to change its shape and position accordingly.

Next, the edges of the person 152 close to the respective knots of multiple candidate curves are detected. The multiple candidate curves are described by the various parameters of the template Qt, such as intervals of the control points and knots, and various sets of the six parameters of the shape-space vector x. Likelihoods of the candidate curves are then calculated from the distances between the edges and the knots. The probability density distribution in the six-dimensional space spanned by the six parameters of the shape-space vector x is estimated based on these likelihoods.

Figure 4:
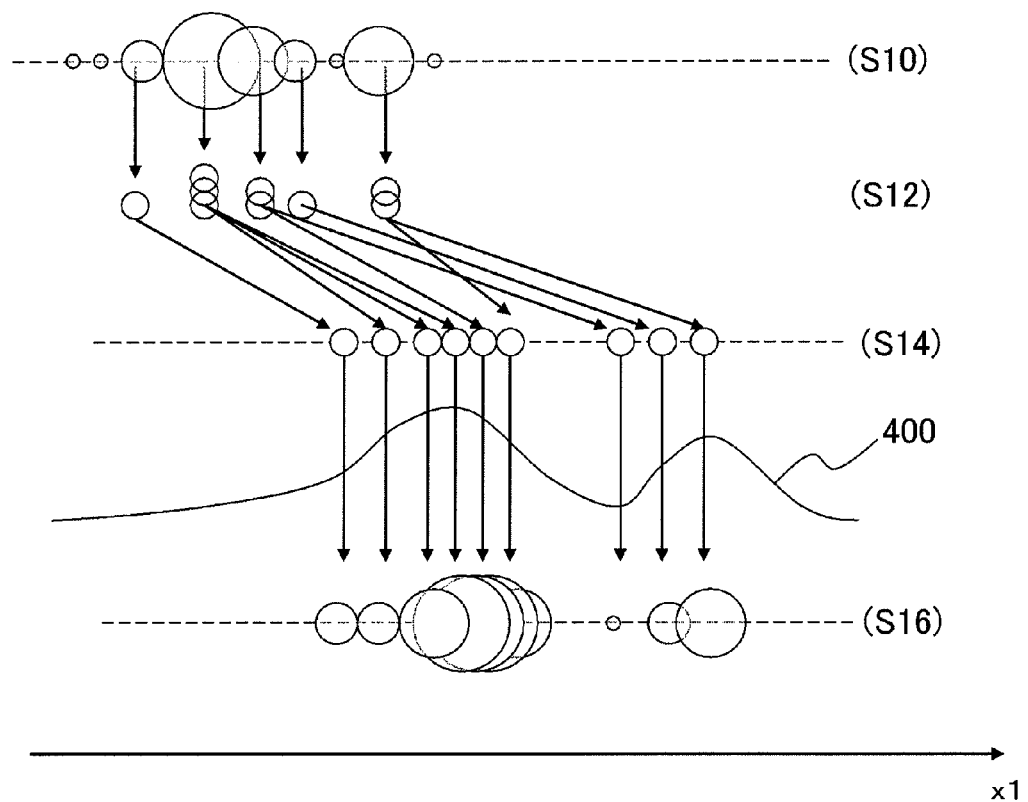
FIG. 4 illustrates a method for probability density distribution estimation using a particle filter.

FIG. 4 illustrates a method for probability density distribution estimation using a particle filter. In FIG. 4, the horizontal axis shows parameter x1, which is one of the six parameters of the shape-space vector x, to aid understanding of the present invention. However, it should be understood that the other parameters are actually processed in the same manner as the parameter x1 in the six-dimensional space. It will be assumed that the image frame whose probability density distribution is to be estimated is at time step t.

A probability density distribution in the axis for the parameter x1 is given (S10). This probability density distribution is estimated in the image frame at time step t−1, which is one frame previous to the image frame at time step t. Particles at time step t are then created using the estimated probability density distribution (S12). If there are already particles obtained by filtering, it is determined at this point whether the particles are divided or eliminated. The probability density distribution given at step S10 is discretely calculated in accordance with the coordinates in the parameter space, and it shows that the larger the circle, the higher the probability density.

The particles are a representation of the sample values of the parameter x1 and the sampling densities. For example, a high probability density region of parameter x1 at time step t−1 is described by particles with a high density for intensive sampling; a low probability density region is described by particles with a low density, so that fewer samples are produced. This allows for efficient matching by creating a large number of the candidate curves near the edge of the person 152, for example.

The particles are then caused to make a transition in the parameter space using a given motion model (S14). The motion model is, for example, a Gaussian motion model, or an autoregression motion model. The Gaussian motion model defines that a probability density at time step t shows a Gaussian distribution around each probability density at time step t−1. The autoregression motion model is a technique that hypothesizes an autoregression prediction model obtained by more than second-order analysis of sample data; for example, it hypothesizes from changes in the previous parameters that the person 152 moves at a constant speed. With reference to FIG. 4, the motion in the positive direction of the parameter x1 can be assumed by the autoregression motion model, and the particles are caused to make a transition accordingly.

The edges of the person 152 close to the candidate curve specified by each particle is detected using the edge image at time step t, the likelihoods of the candidate curves are calculated using the detection result, and the probability density distribution at time step t is estimated based on these likelihoods (S16). As described above, the estimated probability density distribution discretely shows a true probability density distribution 400, as shown in S16. The probability density distribution at each time step is described in the parameter space by repeating the above detailed process. For example, when a probability density distribution is unimodal, in other words, if there is only one target object, a curve estimated to be the contour of the target object is obtained by using a sum of the parameter values weighted according to the probability densities as an ultimate parameter.

The probability density distribution $p(\hat{x}_t^i)$ at time step t estimated in S16 is calculated as follows:

$$p(\hat{x}_t^i) = \eta p(y_t|\hat{x}_t^i) \int p(\hat{x}_t^i|\hat{x}_t^i, u_{t-1}) p(\hat{x}_{t-1}^i) d\hat{x}_{t-1}^i \quad (3)$$

where i is a unique particle number, $p(\hat{x}_t^i|\hat{x}_t^i, u_{t-1})$ is a given motion model, and $p(y_t|\hat{x}_t^i)$ is a likelihood. The probability density distribution given by expression (3) is obtained for each parameter of the shape-space vector. Accordingly, the shape-space vector of each time step is estimated by obtaining an average of the particles weighted by the probability density distribution.

Figure 5:
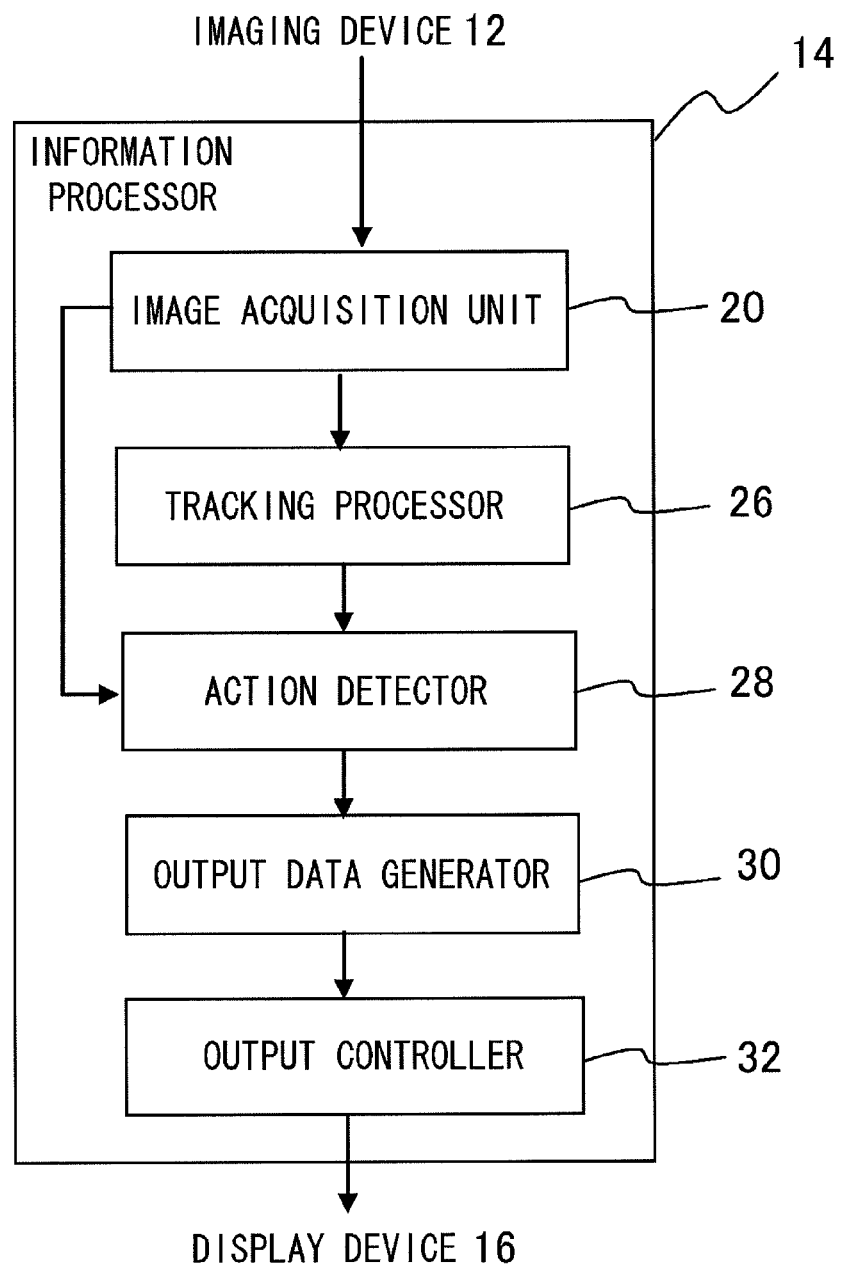
FIG. 5 shows the configuration of the information processor according to the embodiment in detail.

FIG. 5 shows the configuration of the information processor 14 in detail. The information processor 14 includes: an image acquisition unit 20 for acquiring input image data from the imaging device 12; a tracking processor 26 for performing the above-mentioned visual tracking process; an action detector 28 for detecting the action of the user by referring to a time-dependent change of the relative position of the head contour determined as a result of tracking in relation to the image, captured in the input image, of the light-emitting part 6 of the light-emitting device 18; an output data generator 30 for generating output data such as image data by executing an application such as a game that uses the action thus detected; and an output controller 32 for controlling the output of the data thus generated to, for example, the display device 16.

Figure 6:
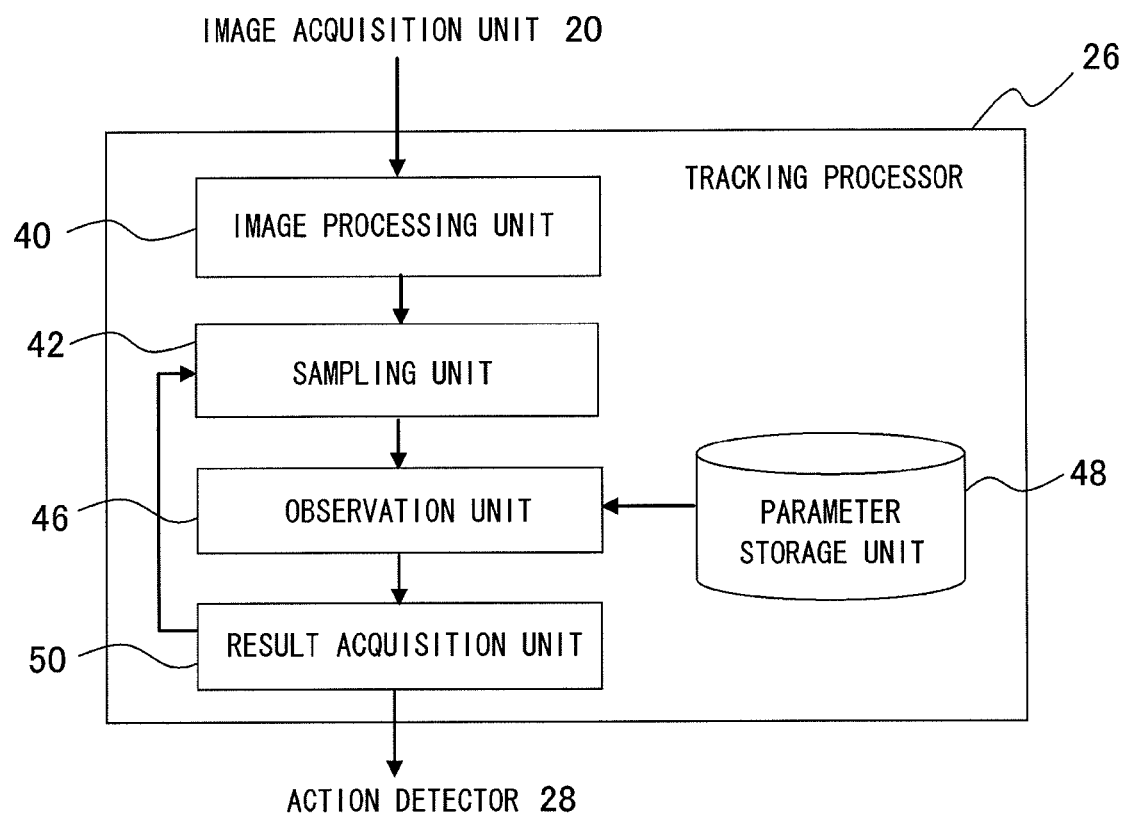
FIG. 6 shows the configuration of the tracking processor according to the embodiment in detail.
Figure 7:
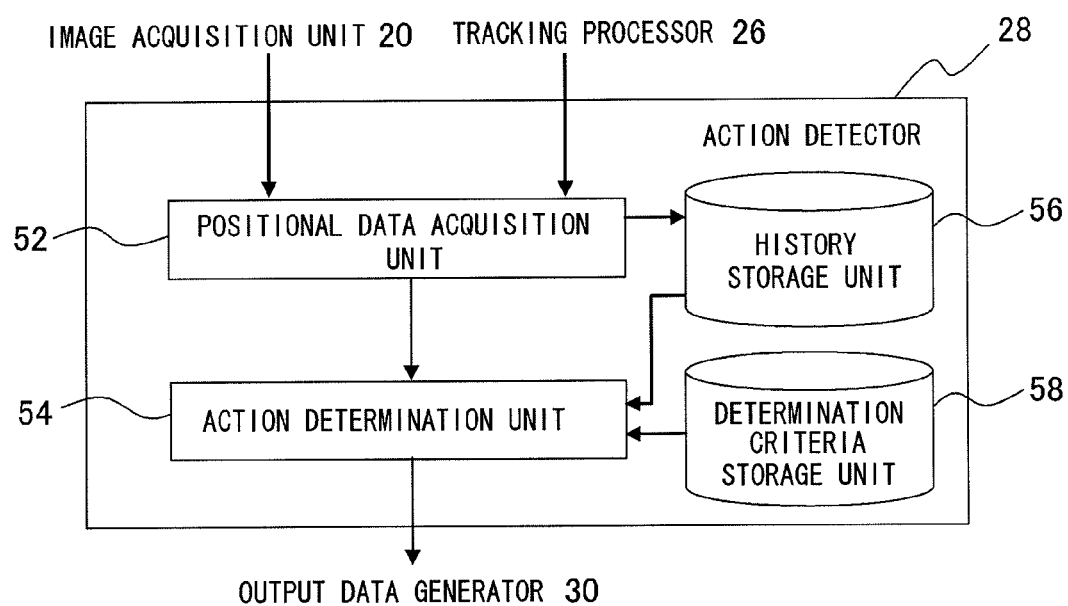
FIG. 7 shows the configuration of the action detector according to the embodiment in detail.

The elements depicted in FIGS. 5, 6 and 7 as functional blocks for performing various processes are implemented in hardware by CPUs, memories, or other LSI's, and in software by programs etc., for performing image processing. Therefore, it will be obvious to those skilled in the art that the functional blocks may be implemented in a variety of manners by hardware only, software only, or a combination of thereof.

The image acquisition unit 20 acquires an image that captures the user on a real time basis from the imaging device 12 by cable or by radio. The tracking processor 26 tracks the head contour of the user using the above-mentioned method for visual tracking. The action detector 28 detects the action of the user based on the curve data representing the head contour occurring at a time step for each image frame obtained as a result of tracking by the tracking processor 26, and the positional data indicating the position of the image of the light-emitting part 6 at the time step.

The output data generator 30 generates output data such as image data by performing a process corresponding to a predetermined action as detected by the action detector 28. Since the embodiment is applicable to various applications as mentioned above, the output data generator 30 may not only generate image data but also perform processes adapted for different applications. For example, the action as detected by the action detector 28 may be associated with a process so that the output data generator 30 may perform a process associated with the action.

FIG. 6 shows the configuration of the tracking processor 26 in detail. The tracking processor 26 includes: an image processor 40 for generating an edge image from the input image data; a sampling unit 42 for performing sampling in a parameter space by creating and eliminating particles; an observation unit 46 for observing the likelihood of the candidate curve defined by each particle; a result acquisition unit 30 for integrating the results of observation and estimating a shape space vector; and a parameter storage unit 48 for storing parameters that define an ohm-shaped template.

The image processing unit 40 performs an edge extracting process on each image frame of the input image data to generate edge images. A typical edge extracting algorithm, such as the Canny edge filter or the Sobel filter, may be used in the edge extracting process. The image processing unit 40 may perform preprocess prior to the edge extracting process, in order to efficiently extract the edges of the target object. For example, the image processing unit 40 may include a foreground extractor (not shown) which uses background subtraction, thereby extracting foreground objects including the target object from the input image.

The sampling unit 42 creates and eliminates particles based on the probability density distribution defined in the shape space vector x and estimated for the image frame at the previous time step t−1. The sampling unit 42 applies a predetermined motion model to all of the particles so as to cause the particles to make a transition in the space.

The observation unit 46 observers the likelihood of the candidate curve defined by each particle created, eliminated, or caused to make a transition by the sampling unit 42. The likelihood is determined by searching for an edge in the neighborhood of each candidate curve in an edge image generated by the image processor 40 and by estimating the distance to the edge for each candidate curve. The candidate curve is obtained by applying the parameters defining each particle to the ohm-shaped template read from the parameter storage unit 48.

The result acquisition unit 30 calculates the probability distribution denoted by expression 3 in a space defined by a shape space vector x, based on the likelihood as observed by the observation unit 46. The unit 30 calculates an weighted average of the parameters accordingly. The unit 50 also returns the data to the sampling unit 42 for use in the tracking process at the subsequent time step t+1.

If there is a plurality of target objects, the result acquisition unit 30 tracks respective targets using respective templates. The unit 30 also detects an overlap of target objects by referring to the result of tracking, precluding one behind another from the tracking process at a certain point of time, for example. In this way, even when a current target object is behind another target object, with the result that the likelihood of the hidden object as observed is temporarily lowered, it is possible to prevent the output of an incorrect tracking result.

FIG. 7 shows the configuration of the action detector 28 in detail. The action detector 28 includes: a positional data acquisition unit 52 for acquiring position data for an image, in an image frame acquired at each time step by the image acquisition unit 20, of the light-emitting part 6 of the light-emitting device 18 and also acquiring curve data for the head contour estimated at each time step as a result of visual tracking by the tracking processor 26; a history storage unit 56 for storing a history of the positional data for the image of the light-emitting part 6 and the curve data for the head contour; a determination criteria storage unit 58 for storing a criteria set for the time-dependent change in the relative position of the image of the light-emitting part 6 and the curve of the head contour for determining that a predefined action takes place; and an action determination unit 54 for referring to the determination criteria and determining whether the action takes place based on the actual data.

The positional data acquisition unit 52 acquires a frame of an input image from the image acquisition unit 20 and acquires the coordinates indicating the position of the light-emitting part 6 of the light-emitting device 18 in the image frame. The unit 52 further acquires data for a curve estimated to represent the head contour in each image frame by the tracking processor 26. As described above, the data for the curve representing the head contour results from calculating an weighted average of the parameters of the shape space vector defining each particle according to the probability density distribution. The results thus acquired are represented in a single coordinate system within an image frame space and are stored successively in the history storage unit 56 frame by frame.

The action determination unit 54 reads the data for the position of the image of the light-emitting part 6 and the curve representing the head contour, occurring at an immediately preceding period of time. The unit 54 checks the time-dependent change in the relative position against the determination criteria registered in the determination criteria storage unit 58 so as to determine whether a registered action is performed. The result of determination is communicated to the output data generator 30. The action registered in the determination criteria storage unit 58 and the criteria for determining that a registered action is performed may differ depending on the content of processing performed subsequently by the information processing system 10. The software that defines the content of processing is ensured to include, as additional data, a table that maps the action subject to determination and the determination criteria. The additional data is ensured to be read by the determination criteria storage unit 58 when the software is started.

Figure 8:
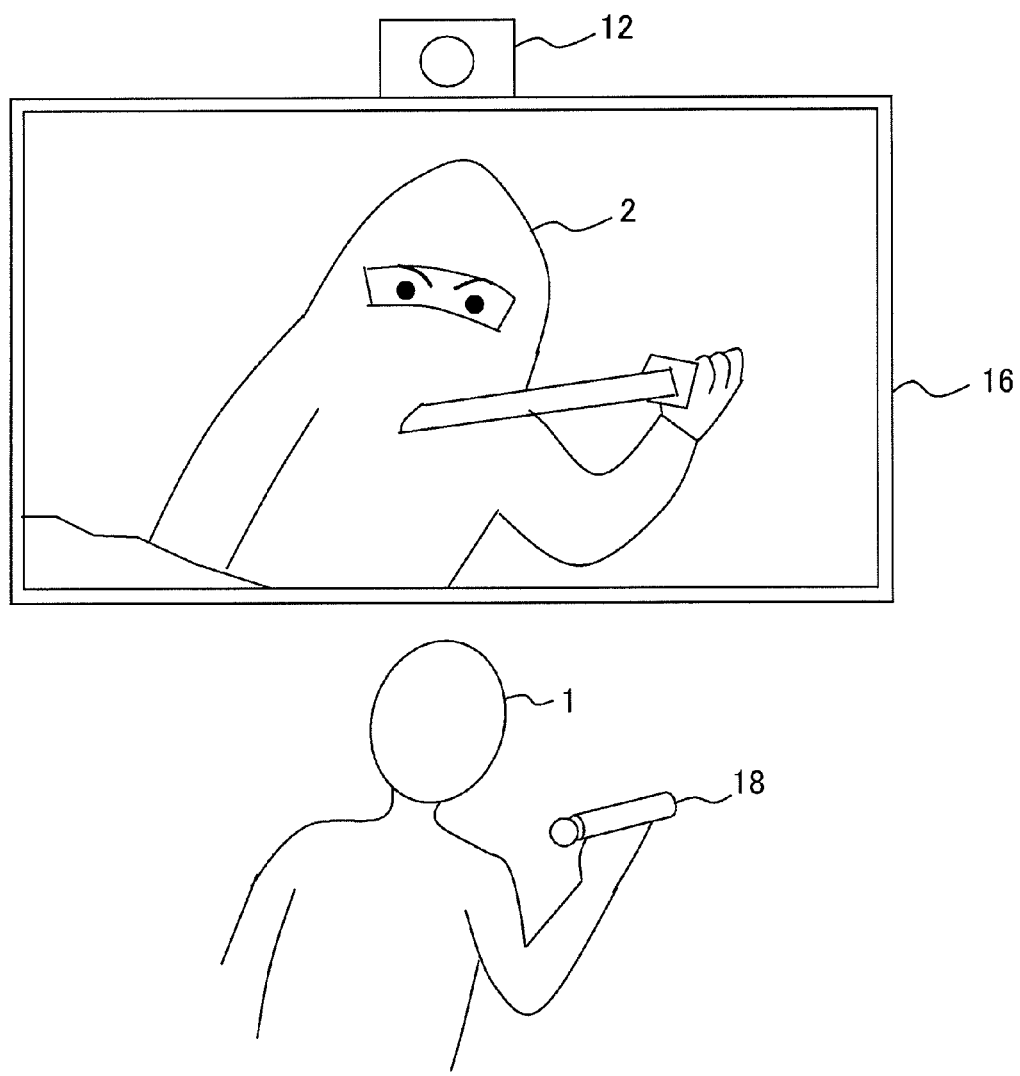
FIG. 8 shows an example of information processing according to the embodiment.

Examples of actions that can be identified from a change in the relative position of the image of the light-emitting part 6 in relation to the curve representing the head contour will now be described along with specific information processing that uses the action thus identified. FIG. 8 shows an example of information processing that can be achieved by the information processing system 10 having the above-described configuration. The figure shows an exemplary role playing game in which a ninja object 2 that moves in response to the motion of the user 1 undertakes an adventure or fights an enemy in a virtual world displayed in the display device 16.

In such an application, the motion of the user 1 as a whole can be detected by acquiring the head contour by the tracking processor 26 as described above. The position of the head of the object 2 in each image frame is determined by using the result of detection. Necessary portions of the body are drawn accordingly. The movement of the user towards or away from the imaging device may be detected by referring to the size of the head contour. The object 2 may be made to advance or recede in the virtual world accordingly. The coordinates of the hand of the object 2 can be determined based on the coordinates of the image of the light-emitting part 6 on the image plane, and the position of the hand of the object 2 in the depth direction can be determined based on size of the image of the light-emitting part 6. In the example of FIG. 8, the object 2 is drawn as a mirror image of the input image capturing the user 1.

Figure 9:
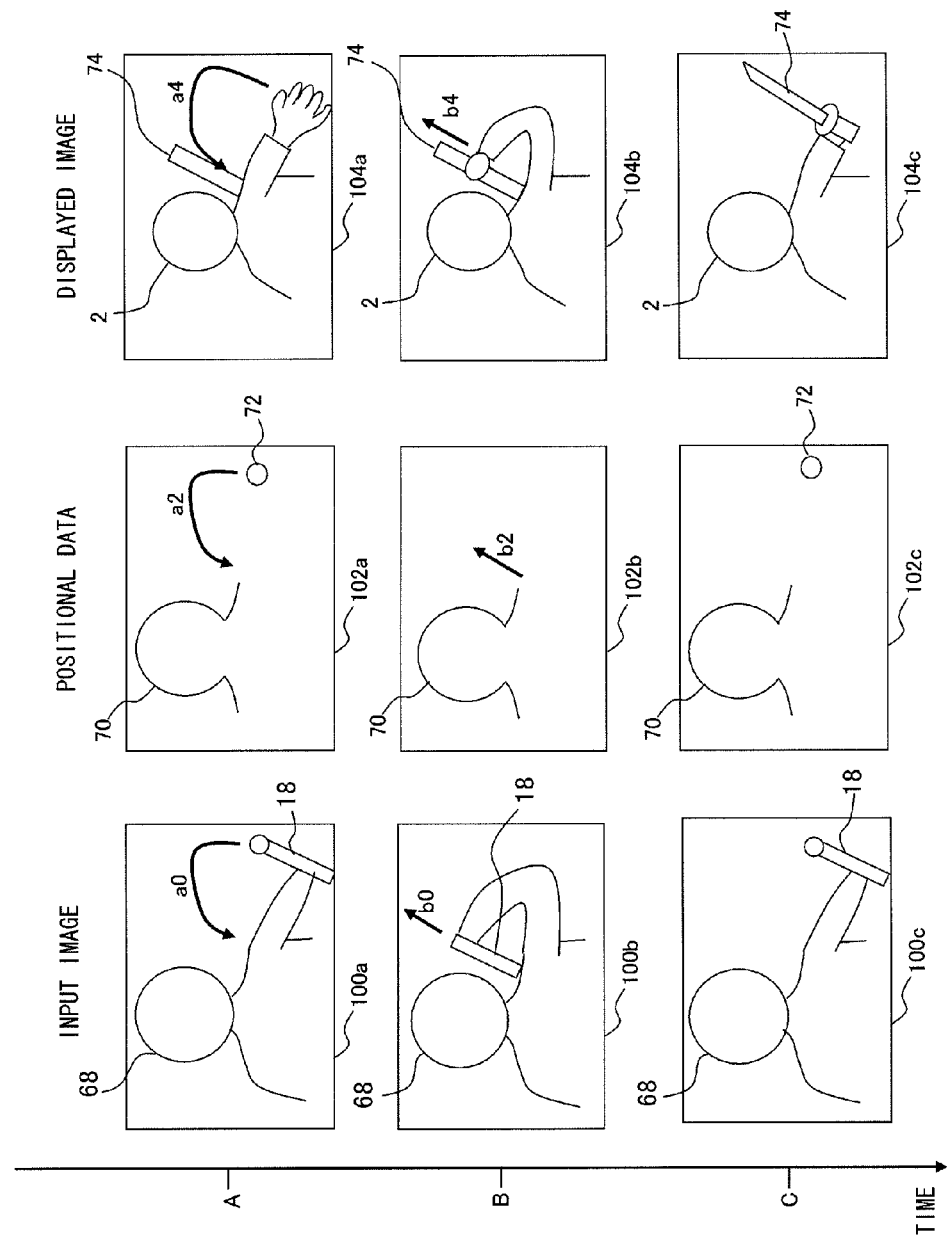
FIG. 9 shows an exemplary process performed by the action detector and the output data generator in an application shown in FIG. 8.

FIG. 9 shows an exemplary process performed by the action detector 28 and the output data generator 30 in an application as shown in FIG. 8. Referring to FIG. 9, the time axis extends downward in the vertical direction. The figure shows i) input images 100*a*, 100*b*, and 100*c*, ii) positional data 102*a*, 102*b*, and 102*c*, and iii) displayed images 104*a*, 104*b*, and 104*c*. The input images 100*a*, 100*b*, and 100*c* are acquired in a time series by the imaging device 12 at time steps A, B, and C, respectively. The data 102*a*, 102*b*, and 102*c* are obtained from the input images and indicate a curve 70 representing the head contour and an image 72 of the light-emitting part 6. The displayed images 104*a*, 104*b*, and 104*b* are drawn based on, for example, the result of detecting an action at the respective time steps.

The time steps A, B, and C represent moments characteristic of the user action. Acquisition of an image, tracking process, determination of an action, and display of the image are successively performed in between the moments at a predetermined frame rate. As shown in FIG. 8, the displayed image may be a mirror image of the image frame capturing the user. FIG. 9 shows, however, images before conversion in order to facilitate the understanding.

An image 68 of the user in the input image 100*a* at time step A holds the light-emitting device 18 at a position captured in the input image 100*a*. The positional data 102*a* indicating the curve 70 representing the head contour and the position of the image 72 of the light-emitting part 6 is acquired from the input image 100*a* and from the result of tracking from the previous image frame. The object 2 in the displayed image 104*a* is drawn based on the positional data 102*a*. More specifically, the position of the head is determined from the curve 70 representing the head contour and the position of the hand is determined from the position of the image 72 of the light-emitting part 6. The entirety of the object 2 is drawn based on the positions thus determined.

It will be assumed that the object 2 is that of a ninja as shown in FIG. 8 and that the ninja holds a sword 74 on his back. The system according to the embodiment successively tracks the curve 70 representing the head contour and the position of the image 72 of the light-emitting part 6. The system determines a complicated user action (e.g., the user pulls out, wields, or sheathes the sword) by referring to the relative position. Due to the flow of action leading to time step A, the sword 74 is displayed as being sheathed on the back and the object 2 is displayed as holding nothing at time step A.

It will be assumed that the user pulls out the sword. In this case, the user, i.e., the image 68 of the user, moves the hand holding the light-emitting device 18 in the direction of arrow a0 in an interval between time step A and time step B. The position of the light-emitting part 6 is traced at a frame rate acquired by the imaging device 12 so that the positional data for the image 72 of the light-emitting part 6 changes as indicated by arrow a2 during the aforementioned interval. In association with this, the displayed image 104*a* shows the hand of the object 2 as indicated by arrow a4.

At time step B, the user, i.e., the image 68 of the user, moves the light-emitting device 18 to a position where the light-emitting part 6 is almost behind the shoulder, as shown in the input image 100*b*. This will prevent the positional data for the image 72 of the light-emitting part 6 from being acquired at time step B. Only the curve 70 defining the head contour is recorded as position data, as indicated by the positional data 102*b*. However, the system of the embodiment is capable of detecting that the light-emitting part 6 is hidden behind the shoulder, i.e. detecting the user action of bringing the hand holding the light-emitting device 18 behind the back, because the time-dependent change of the relative position of the curve 70 representing the head contour in relation to the image 72 of the light-emitting part 6 is successively acquired at a rate on the order of the frame rate.

Detection of the action may not necessarily be done while the light-emitting part 6 is completely hidden. The point is that, even if the part 6 is completely hidden, an error in detecting the light-emitting part 6 is unlikely to occur because the system according to the embodiment acquires the time-dependent change in the relative position as described above. Since the system also acquires the change in the size of the curve 70 representing the head contour and that of the light-emitting part 6, the system is also capable of detecting whether the hand of the user is in front of the body or about to be brought to the back, ensuring highly precise detection. Thus, when the system detects the user action of bringing the hand behind the back, the object 2 is drawn as holding the hilt of the sword 74, as shown in the displayed image 104*b*.

In an interval between time step B and time step C, the user moves the hand holding the light-emitting device 18 in the direction of arrow b0. As the light-emitting part 6 appears from behind the shoulder, the positional data depicts the image 72 of the light-emitting part 6 as appearing from behind the shoulder line, which extends from the head contour, and moving in the direction of arrow b2. When the image 72 of the light-emitting part 6 appears from behind the shoulder line and the object 2 is displayed as holding the hilt of the sword at the immediately preceding time step B, the object 2 is depicted in the displayed image as pulling out the sword it holds from the sheath.

Subsequently, when the user, i.e., the image 68 of the user, lowers the light-emitting device 18 (the input image 100c) at time step C, the current positional data 102c indicating the position of the curve 70 representing the head contour and that of the image 72 of the light-emitting part 6 is acquired (the positional data 102c) and the displayed image 104c is generated based on the data thus acquired (the displayed image 104c). As shown in the figure, the user posture in the input image at time step A is the same as that of time step C. However, the displayed image 104c at time step C shows the object 2 holding the sword 74. Thus, even if the user assumes the same posture in two image frames constituting the input moving image, the posture can be displayed differently as intended by the user, by monitoring the continuous motion in the moving image.

For example, the object 2 is displayed in the image 104c as holding the sword 74 at time step C. Therefore, any action subsequently undertaken by the user similar to the action in the interval between time step A and time step B will be determined as an action of sheathing the sword. The system of the embodiment focuses on the relative position of the head contour (two-dimensional shape) in relation to the image of the light-emitting part 6 (point shape). Therefore, as the sword is pulled out from the sheath or is sheathed, the hidden surface may be removed depending on the distance between the shoulder line, which extends from the head contour, and the image of the light-emitting part 6 so that the tip of the sword will appear hidden behind the object 2.

As a result, more realistic images can be presented. Since the system keeps track of the shoulder line, a determination can be made, when the image of the light-emitting part 6 disappears, as to whether the action shown in FIG. 9 as occurring at time step B is performed or the image is accidentally hidden by the other hand or another person.

For ease of understanding, FIG. 9 shows the head part of the image 68 of the user as not moving much. Since the method of the embodiment is based on the head contour, i.e., the shape that does not depend on the orientation of the face or the orientation of the body, the process can be performed similarly whatever the posture the user assumes. In applications like role playing games and martial arts games as indicated in FIG. 8, it is desirable that the user be permitted to face any direction or move in any direction. Therefore, the advantage of the embodiment will be fully taken advantage of. This will allow a more complicated and realistic virtual world to be presented. Further, the embodiment will also enrich the variety of applications. For example, games that allow the player to lie down may be produced.

Figure 10:
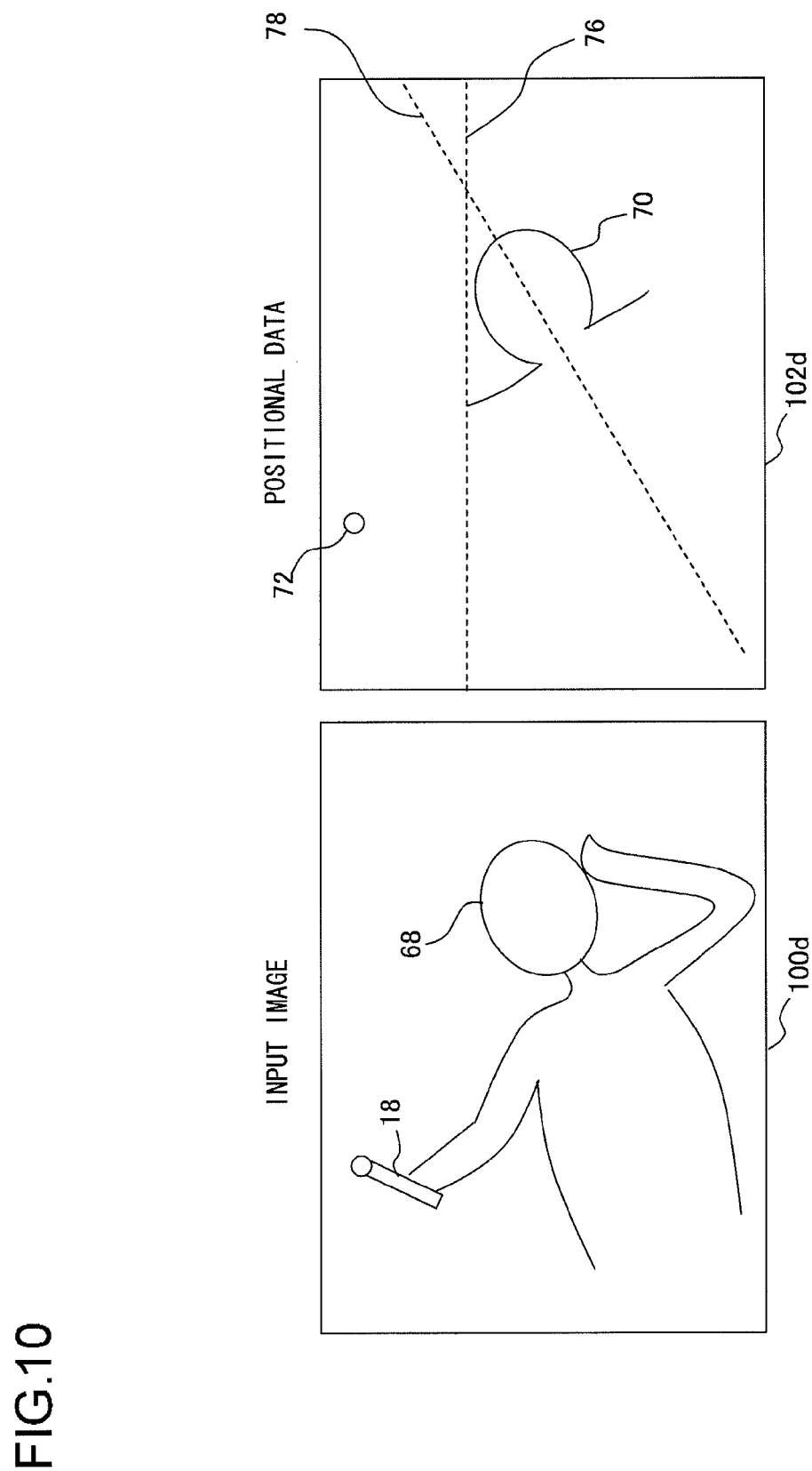
FIG. 10 illustrates a determination criteria applied to the action when the user himself or herself is leaning extensively.

When the posture of the user as shown in FIG. 9 is assumed, a determination as to whether the user pulls out the sword or the user sheathes the sword is made by referring to the determination criteria ("the image 72 of the light-emitting part 6 reaches beyond the shoulder line->the image 72 of the light-emitting part 6 approaches the shoulder line again before disappearing) applied to the time-dependent change in the positional data and depending on whether the user had been holding the sword or not. The system reflects action as determined in the displayed image while also performing a necessary process such as hidden surface removal. Meanwhile, another criteria may be prepared in anticipation of a case where the shoulder leans heavily as a result of, for example, the user lying down. FIG. 10 illustrates a determination criteria applied to the action when the user himself or herself is leaning (tilted) heavily.

The input image 100a of FIG. 10 shows the image 68 of the user moving the light-emitting device 18 lying on his or her back. In this posture, the user action of lifting the light-emitting device 18 does not necessarily concur with the movement of image of the light-emitting part 6, as captured in the positional data 102d, beyond the shoulder line, which extends from the head contour. This is addressed by introducing a horizontal line 76 as an additional determination criteria. The horizontal line 76 is a level line that passes through the point that is located on the curve 70 representing the head contour and that defines the upper end of the shoulder.

When the image 72 of the light-emitting part 6 moves above the horizontal line 76, the user action of lifting the hand is identified. When the image 72 moves below the horizontal line 76, the user action of lowering the hand is identified. Whether the user lies down or the user leans to the extent that the user almost lies down can be determined by providing a threshold of the inclination of the length (longitudinal direction), indicated by a broken line 78 in the figure, of the head contour with respect to the vertical direction. The inclination can be determined by referring to the parameter θ forming the shape space vector that defines the curve 70 of the head contour and denoting the angle of rotation. The determination criteria is switched when the inclination grows beyond the threshold. The horizontal line 76 as a determination criteria is only by way of example. The criteria may be established depending on the content of information processing performed subsequent to the detection of the action.

Figure 11:
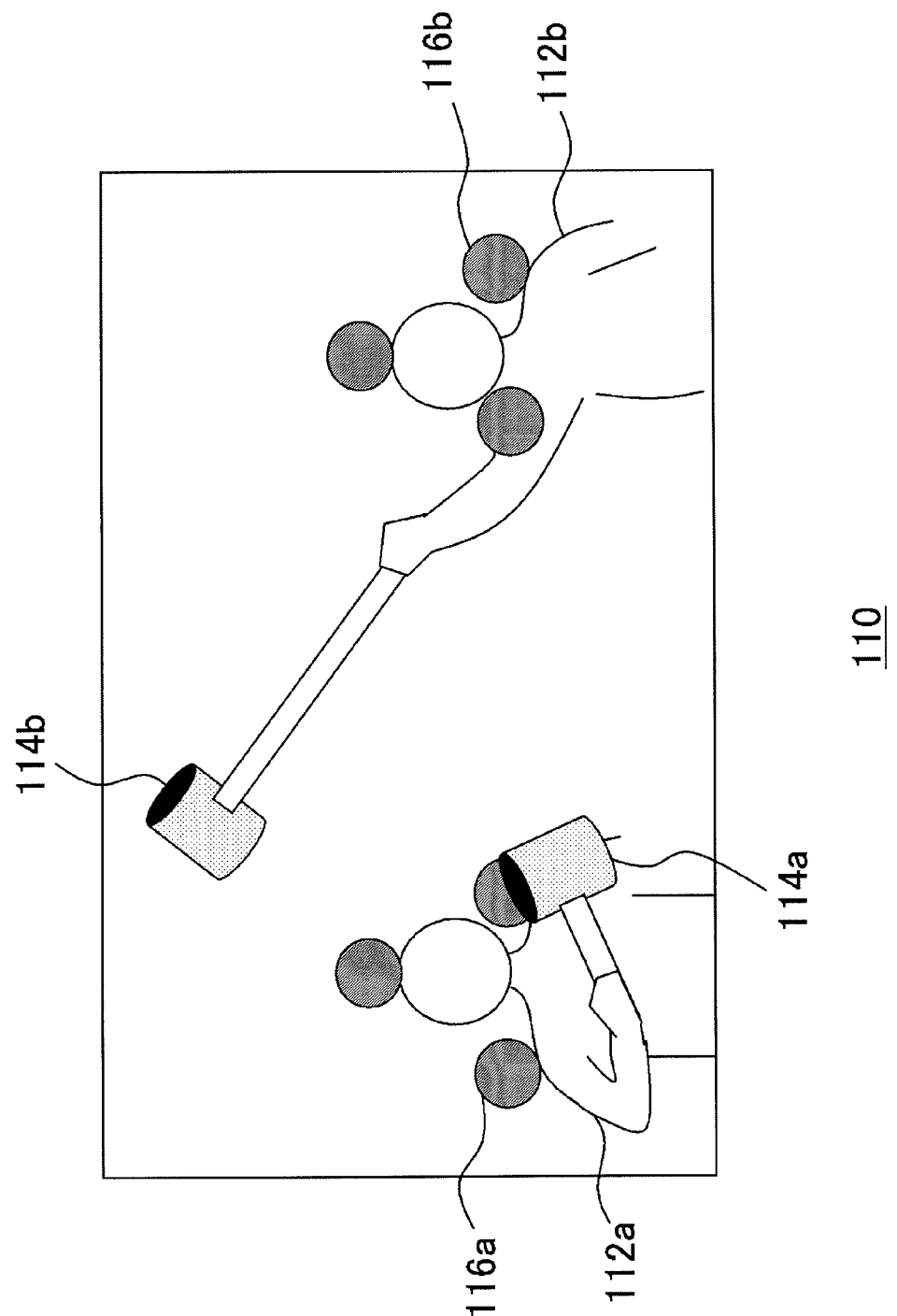
FIG. 11 shows an exemplary image displayed in another example of information processing.

A description will now be given of another example of information processing using the detection of action by referring to a change in the relative position of the image of the light-emitting part 6 in relation to the curve representing the head contour. In this example, two users each holding the light-emitting device 18 are captured in an image. Objects representing the two users and reflecting the motion of the users are displayed on the display device 16. FIG. 11 shows an exemplary image displayed in such an application. Objects 112a and 112b in a displayed image 110 correspond to the two users. The objects may be drawn using computer graphics. Alternatively, the user as captured in the image may be displayed unmodified or turned into a mirror image before being displayed. In the displayed image 110, objects 116a and 116b representing balloons are drawn on the head and shoulders of the users. Objects 114a and 114b representing hammers are drawn in the hands of the users holding the light-emitting devices 18.

According to the configuration as described above, a game can be created where the user attempts to burst the balloon attached to the opponent's object with the hammer that the user's object holds, by shaking the light-emitting device 18 while viewing the displayed image 110 displayed on the display device 16. In this case, too, the user action of lifting the hammer is detected by referring to a time-dependent change in the relative position of the image of the light-emitting part 6 of the light-emitting device 18 in relation the line of the shoulder of the user holding the device 18. As mentioned above, the shoulder line as part of the head contour is tracked whatever posture the user takes. Accordingly, the timing of attempted lifting of the hammer can be detected by tracking the motion of the light-emitting part 6 with reference to the line.

In addition to detecting the user action, a gyrosensor may be built in the light-emitting device 18 as mentioned above so that the measurement of the angular speed of the light-emitting device 18 is reflected in the displayed image 110. For example, when the attempted action of lowering the hammer is detected, the handle of the hammer may be elongated according to the angular speed of the light-emitting device 18. In the example of FIG. 11, the handle of the object 114b representing the hammer of the user attempting to lower the hammer is longer than the handle of the object 114a representing the hammer of the other user. In this way, a game can be created where users compete for the speed of bursting the opponent's balloon, considering the change in the length of the handle.

A second criteria may be provided. For example, the point of time preceding the determination that the hammer is determined to be lifted (e.g., the point of time when the speed of the image of the light-emitting part 6 moving upward past the shoulder line is about to exceed a predetermined level) may be the second criteria. When the second criteria is met, the system may determine that the user is about to lift the hammer and speculatively perform a process predicted to be subsequently necessary (e.g., the process of drawing an image of the lifted hammer or the start of measurement by the gyrosensor). With this, the response of the displayed image to the user motion can be improved.

Where multiple users are captured in an image as in the application of FIG. 11, it is necessary to determine which user each of the images of the light-emitting parts 6 of the light-emitting devices 18 held by the users belongs to. Since the shoulder line of the user is acquired according to the embodiment, the image of the light-emitting part can be mapped into the user by referring to the inclination of the shoulder line and the position of the image of the light-emitting part. In other words, if the shoulder line is lifted as in the case of the user image 112b, the image of the light-emitting part in the neighborhood of the extension of the shoulder line is that of the light-emitting device 18 that the user holds.

Alternatively, the image of the light-emitting part 6 may be mapped into the curve representing the head contour when the game is started. More specifically, the user may hold the light-emitting device 18 so that the light-emitting part 6 is in contact with the shoulder or the top of head. The resultant image may be used as an initial image in the process of tracking the head contour and in the acquisition of the positional data indicating the position of the image of the light-emitting part 6. The change in the successive positions with time is tracked both in the tracking process and the acquisition of positional data. Therefore, it is ensured that the image and the curve are properly mapped into each other at any time step by acquiring the correspondence between the head contour and the image of the light-emitting part.

In acquiring the initial image, the relative size of the image of the light-emitting part 6 in relation to the size of the head derived from the head contour may be acquired. A determination can be made as to whether the light-emitting part 18 is behind or in front of the user by comparing the relative sizes as acquired during the game with the initial relative sizes as the criteria. In other words, if the image of the light-emitting part 6 is relatively larger, it is determined that the light-emitting device 18 is closer to the imaging device 12 than the user head. If the image is smaller, it is determined that the light-emitting device 18 is further away from the imaging device 12 than the user head. By using the result of determination to modify the time-dependent change in the relative position of the image of the light-emitting part in relation to the curve representing the head contour, a more complicated action may be identified or a speculative process may be performed.

The applications as shown in FIG. 8 and in FIG. 11 are only by way of example. Detection of action using a time-dependent change in the relative position of the curve representing the head contour in relation to the image of the light-emitting part of the light-emitting device held by the user can be applied to various information processing. For example, the user action may be used as a substitute for a mouse. Specifically, the motion of the user as captured in an image is categorized into four types. The types are assigned to the four capabilities that a mouse is generally equipped with.

Figure 12:
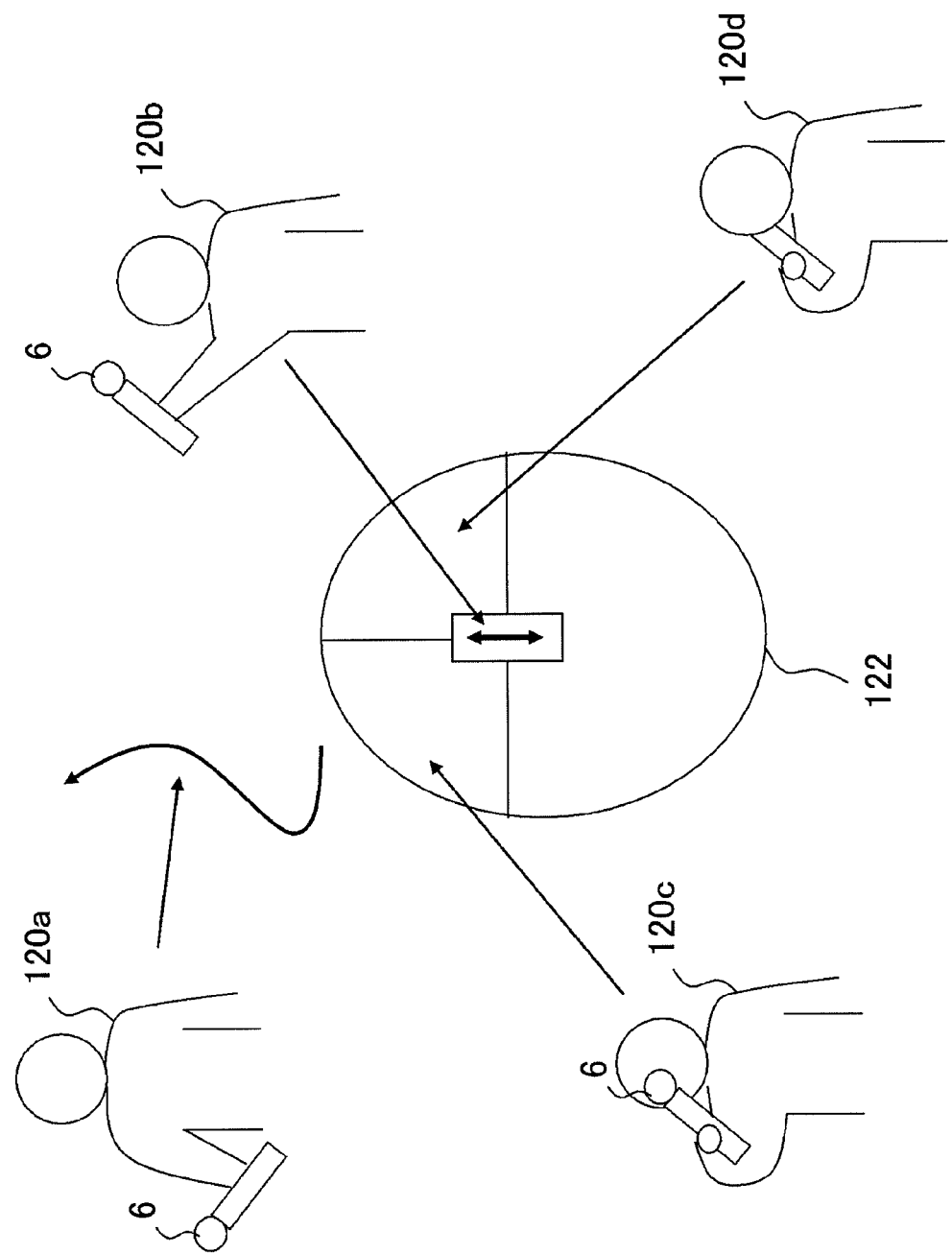
FIG. 12 shows an example of assignment where a user action is used as a substitute for a mouse.

FIG. 12 shows how actions are assigned in this mode. In this example, the user state is categorized into four types, namely, i) the state in which the light-emitting part 6 is below the shoulder line (type 120a); ii) the state in which the light-emitting part 6 is above the shoulder line and removed from the head contour (type 120b); iii) the state in which the light-emitting part 6 is above the shoulder line and in front of the head contour (type 120c); and iv) the state in which the light-emitting part 6 is above the shoulder line and behind the head contour (type 120d). The four types are assigned to the movement of the mouse 122 body, scroll, right click, and left click, respectively.

In the case of the type 120a, the distance between the light-emitting part 6 and the head contour is converted into the moving speed of the mouse. The direction of movement is determined by the relative position of the light-emitting part 6 in relation to the head contour. In the case of the type 120b, the distance between the light-emitting part 6 and the head contour is converted into the scroll speed and the direction of scroll is determined by the relative position of the light-emitting part 6 in relation to the head contour. In the type 120d, the light-emitting part 6 is hidden behind the head and cannot be seen. Since the positional change in the image of the light-emitting part 6 is acquired, the part 6 can be identified as being behind the head. Distinction between type 120c and 120d can be made depending on whether the light-emitting part 6 is visible.

The user performs one of the types of action depending on the need, while viewing the screen of the display device 16. In order to determine whether the user performs an action intentionally, a rule may be set up to initiate the step of type determination. For example, when the user performs one of the types of action while pressing the button provided in the light-emitting device 18, the subsequent process may be performed. Type determination may alternatively be started when the button is not pressed or when the light-emitting part 6 starts emitting light. When the type of user action is identified, the action is converted into a mouse operation according to the above-mentioned assignment. Subsequently, the image on the screen is changed as if according to an ordinary mouse operation. According to the variation described above, the head contour (two-dimensional shape) and the shape of the light-emitting part 6 are simultaneously acquired and the their time-dependent change is acquired so that a simple action may easily replace a mouse operation.

Figure 13:
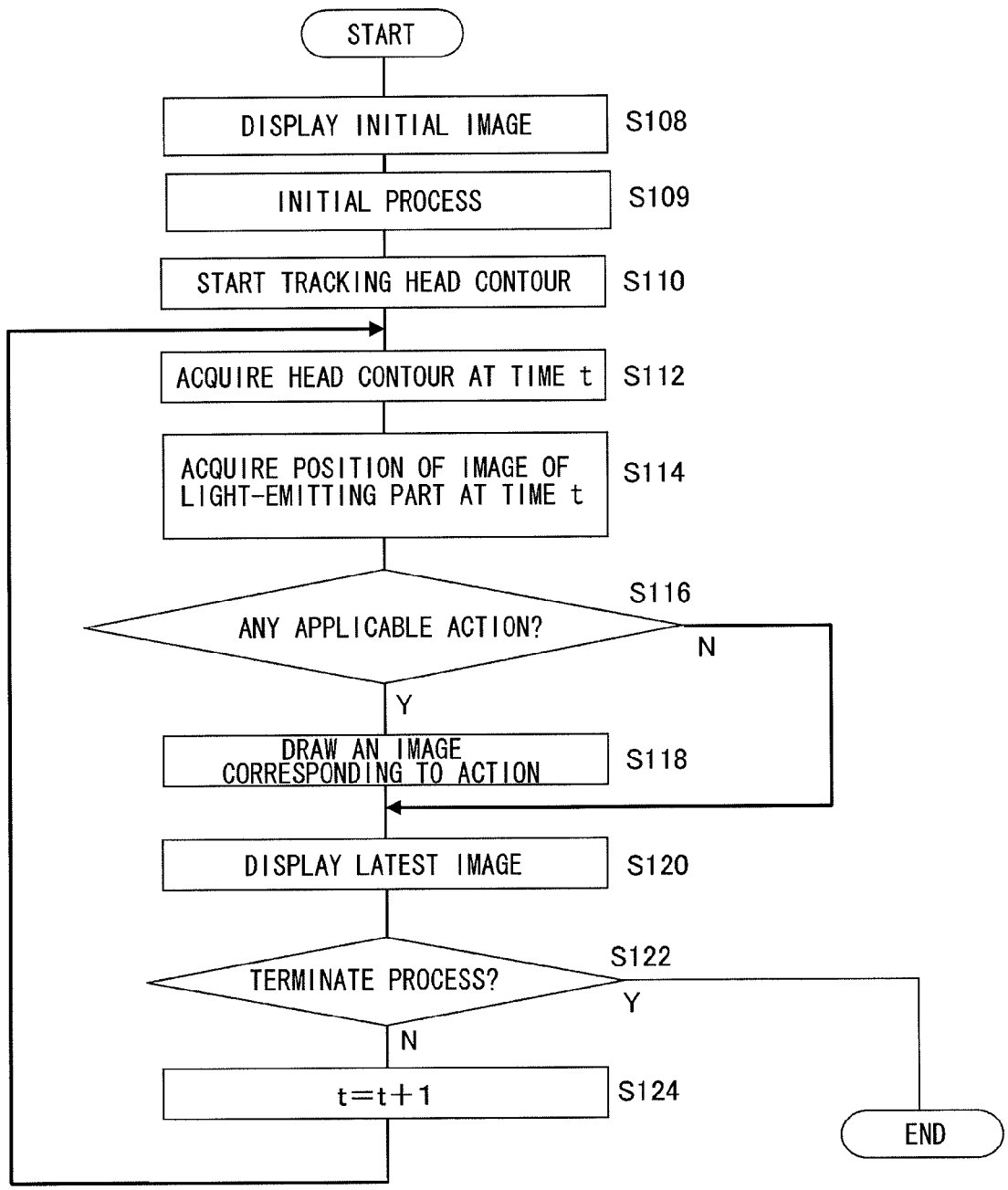
FIG. 13 is a flowchart showing the steps performed by the information processor to display an object that moves in a way that the user action is reflected.

A description will now be given of the operation of the information processor 14 that can be implemented by the configuration as described above. FIG. 13 is a flowchart showing the steps performed by the information processor 14 to display an object that moves in a way that the user action is reflected. When the user holds the light-emitting device 18 and starts the application software, the imaging device 12 starts capturing the image of the user and displays an initial screen on the display device 16 (S108).

The software is started by the user by depressing a start button (not shown) provided in the light-emitting device 18. When the software is started, the information processor 14 controls the light-emitting part 6 of the light-emitting device 18 to emit light. Alternatively, the user may start light emission using an on and off button (not shown) provided in the light-emitting device 18. Subsequently, an initial process is performed as necessary (e.g., the correspondence between the head contour of each user and the image of the light-emitting part is acquired) (S109).

Meanwhile, the tracking processor 26 successively reads the input image captured by the imaging device 12 and starts visual tracking of the head contour (S110). As a result of the tracking step, the positional data acquisition unit 52 of the action detector 28 acquires the curve data for the head contour in an image frame at current time step t. The unit 52 also acquires the positional data for the image of the light-emitting part 6 from the input image frame acquired by the image acquisition unit 20 (S112, S114). The data are stored in the history storage unit 56 in a time series. The action determination unit 54 reads the time-dependent change in the relative position of the curve representing the head contour in relation to the image of the light-emitting part in a predetermined period of time up to the current time and determines whether any of the determination criteria registered in the determination criteria storage unit 58 for determination of an action is met (S116).

As mentioned above, for determination of a single action, criteria may often have to be set up for multiple time steps that occur during the transition in relative position. Therefore, the action determination unit 54 continues monitoring the relative position for a predetermined period of time and determines, when all of the criteria are met, that the corresponding registered action is performed. When the registered action is determined to be performed (Y in S116), an image corresponding to the action is drawn (S118). More specifically, the object in the displayed image is caused to make a movement corresponding to the identified action or the action is converted into a mouse operation so as to change the displayed image accordingly.

Further, the ultimate, latest image is displayed by, for example, moving the object as needed in association with the movement of the curve representing the head contour or of the light-emitting part 6 (S120). Even when the registered action is not performed (N in S116), the latest image is similarly displayed with necessary movements added (S120). When it is not necessary to terminate the process (N in S122), steps S112 through S120 are repeated at time step t+1 representing the subsequent image frame. The process is terminated when the user designates the end of process or when the game ends (Y in S122).

According to the embodiment described above, the user's head part is subject to time evolution tracking using the visual tracking technology and the position of the image of the light-emitting part of the light-emitting device held by the user is successively acquired. The time-dependent change in the relative position is checked against a predetermined criteria to make a determination as to whether a registered action takes place. Whatever the posture the user takes or whatever direction the user faces, the posture or orientation hardly affects the shape of the head contour. Therefore, the orientation of the user's hand in relation to the body can be accurately detected. A similar process is possible even if the position of the imaging device is changed. Consequently, the system can be adapted to an extensive variety of environments or complicated actions. This will increase the variety of applications (e.g., games) to which the system is applicable and allow more realistic virtual worlds to be presented.

Further, since the time-dependent change is acquired, the location of the image of the light-emitting part can be detected even when it is behind the user, for example. This allows the system to be used in a variety of processes. For example, the surface of an object drawn in the displayed image may be removed by referring to, for example, the shoulder line, or the state of being hidden may be assigned to a mouse capability. The embodiment can be implemented simply by preparing a light-emitting device and an imaging device, aside from using an ordinary information processing system. Accordingly, there is no need to attach numerous light-emitting objects to a body and so the user need not experience much trouble. Since the devices needed are limited, the system can be implemented at a low cost. As compared with action detection based on a process that is basically performed for still images (e.g., face recognition or pattern matching), more accurate and faster action determination can be performed.

Since a prediction that an action is about to be performed can be made by referring to a time-dependent change in the relative position before determining that the action takes place, highly responsive applications can be implemented by speculatively performing a post-determination process.

Given above is an explanation of an embodiment of the present invention. The embodiment is intended to be illustrative only and it will be obvious to those skilled in the art that various modifications to constituting elements and processes could be developed and that such modifications are also within the scope of the present invention.

For example, multiple users lined up may be imaged. The user who raises the hand may be detected so that the system can zoom in on that user automatically. In this case, the user may have a light-emitting object attached to the hand instead of holding a light-emitting device. The hand is determined to be raised when a time-dependent change occurs in which the light-emitting object approaches the level of the shoulder of the user from below and goes past the level, or when the state of being raised above the level continues for a predetermined period of time. Even when multiple users raise hands, the earliest one to raise the hand can be identified by referring to the timing of determination of the raised hand.

What is claimed is:

1. An information processor comprising:
an imaging device adapted to capture the motion of a user provided with a marker as a moving image;
a tracking process unit adapted to estimate the contour of the user in each image frame by defining a candidate curve representing the contour of the user in an image frame included in the moving image captured by the imaging device based on the contour of the user estimated in an image frame at a previous time step, and by observing the likelihood of each candidate curve;
a history storage unit adapted to successively store the relative position, in each image frame, of an image of the marker in relation to the contour of the user estimated by the tracking process unit;
an action determination unit adapted to determine whether an action is performed by checking a time-dependent change in the relative position stored by the history storage unit against a first criteria established for the action; and
an output data generating unit adapted to perform, when the action determination unit determines that the action is performed, a process corresponding to the action and generate output data.

2. The information processor according to claim 1, wherein the action determination unit detects that the marker is hidden behind the back of the user and the position of the marker thus hidden, by referring to a time-dependent change in the relative position, and determines whether the action is performed according to the position of the hidden marker.

3. The information processor according to claim 2, wherein the output data generating unit generates, in response to the action detected by the action determination unit, a displayed image in which an object that moves in accordance with the user motion is drawn, and removes, when the action determination unit detects that the marker is hidden behind the back of the user and the position of the marker thus hidden by referring to the time-dependent change in the relative position, a hidden surface so that at least a part of an article held by the object is hidden accordingly.

4. The information processor according to claim 1, wherein the tracking process unit estimates the head contour including the shoulder line of the user, and the action determination unit determines whether an action involving the user's arm is performed by checking a time-dependent change in the relative position of the image of the marker held by the user in relation to the shoulder line against the first criteria.

5. The information processor according to claim 4, wherein the action determination unit switches the first criteria for determination as to whether the action involving the user's arm is performed to another criteria established as to a time-dependent change in the relative position of a horizontal line passing through a point that defines an upper end of the should line as part of the head contour in relation to the image of the marker, when an inclination of the longitudinal direction of the head contour with respect to the vertical direction becomes larger than a predefined threshold.

6. The information processor according to claim 4, wherein the imaging device captures the motion of multiple users each holding a marker, and the action determination unit acquires the correspondence between the image of the marker and the shoulder line by referring to the relation between the inclination of the shoulder line and the position of the image of the marker, and determines whether the action is performed for each user, by checking the time-dependent change in the relative position of the image of the marker in relation to the corresponding shoulder line against the criteria.

7. The information processor according to claim 1, wherein the action determination unit predicts that an action will be performed by checking the time-dependent change in the relative position against a second criteria established for each action, and the output data generating unit speculatively performs a process that should be performed in association with the predicted action, before a determination is made that the action is performed.

8. The information processor according to claim 1, wherein the output data generating unit changes the output data generated by the unit in accordance with an angular speed of the marker detected by a gyrosensor provided inside the marker.

9. The information processor according to claim 1, wherein the time-dependent change in the relative position as checked by the action determination unit includes a time-dependent change in a relative distance from the imaging device which is estimated from a change in relative size of the image of the marker in relation the contour of the user.

10. The information processor according to claim 1, wherein the output data generating unit performs a process corresponding to a capability of an input device associated with a type of action detected by the action determination unit.

11. An information processing method comprising:

capturing the motion of a user provided with a marker as a moving image;

estimating the contour of the user in each image frame by defining a candidate curve representing the contour of the user in an image frame included in the moving image captured by the imaging device based on the contour of the user estimated in an image frame at a previous time step, and by observing the likelihood of each candidate curve;

successively storing in a memory the relative position, in each image frame, of an image of the marker in relation to the estimated contour of the user;

determining whether an action is performed by checking a time-dependent change in the relative position read from the memory against a criteria established for the action; and performing, when the action is determined as being performed, a process corresponding to the action and generating output data.

12. A computer program embedded on a non-transitory computer readable storage medium for causing a computer to process data for a moving image capturing a user provided with a marker as input data, comprising:

a module adapted to estimate the contour of the user in each image frame by defining a candidate curve representing the contour of the user in an image frame included in the moving image based on the contour of the user estimated in an image frame at a previous time step, and by observing the likelihood of each candidate curve;

a module adapted to successively store in a memory the relative position, in each image frame, of an image of the marker in relation to the estimated contour of the user;

a module adapted to determine whether an action is performed by checking a time-dependent change in the relative position read from the memory against a criteria established for the action; and a module adapted to perform, when the action is determined as being performed, a process corresponding to the action and generate output data.

13. A non-transitory computer readable storage medium embodying a computer program for causing a computer to process data for a moving image capturing a user provided with a marker as input data, the program comprising:

a module adapted to estimate the contour of the user in each image frame by defining a candidate curve representing the contour of the user in an image frame included in the moving image based on the contour of the user estimated in an image frame at a previous time step, and by observing the likelihood of each candidate curve;

a module adapted to successively store in a memory the relative position, in each image frame, of an image of the marker in relation to the estimated contour of the user;

a module adapted to determine whether an action is performed by checking a time-dependent change in the relative position read from the memory against a criteria established for the action; and a module adapted to perform, when the action is determined as being performed, a process corresponding to the action and generate output data.

* * * * *